United States Patent [19]

Beaulier

[11] Patent Number: 4,568,981
[45] Date of Patent: Feb. 4, 1986

[54] FONT RECALL SYSTEM AND METHOD OF OPERATION

[75] Inventor: Daniel A. Beaulier, Menlo Park, Calif.

[73] Assignee: Ampex Corporation, Redwood City, Calif.

[21] Appl. No.: 483,350

[22] Filed: Apr. 8, 1983

[51] Int. Cl.[4] ............................................. H04N 5/275
[52] U.S. Cl. ....................................... 358/183; 358/22
[58] Field of Search ............... 358/183, 181, 182, 185, 358/22

[56] References Cited

U.S. PATENT DOCUMENTS

| | | | |
|---|---|---|---|
| 3,465,097 | 9/1969 | Brabon et al. | 358/185 |
| 3,532,806 | 10/1970 | Wicklund | 358/183 |
| 4,360,831 | 11/1982 | Kellar | 358/182 |
| 4,419,662 | 12/1983 | Puskas | 358/183 |
| 4,420,770 | 12/1983 | Rahman | 358/183 |

Primary Examiner—Tommy P. Chin
Attorney, Agent, or Firm—Gregory L. Roth; Rodney L. Marett; Bradley A. Perkins

[57] ABSTRACT

A font recall system stores a font of alpha-numeric characters in a video display format for selective insertion as a caption into a video image. Characters are stored on a video disk in digital pixel form with full dynamic resolution. Low pass filtering is employed to preserve high image quality and eliminate jagged edge aliasing at character boundaries. A first frame store receives selected characters from the video disk through an image size reducer to store the characters at selected display positions with a selected size to form a caption under control of a central processing unit. A keyer receives the caption video data from the first frame store as well as a background image to form a composite image, which is stored in the second frame store before being output as a continuous television video signal.

15 Claims, 3 Drawing Figures

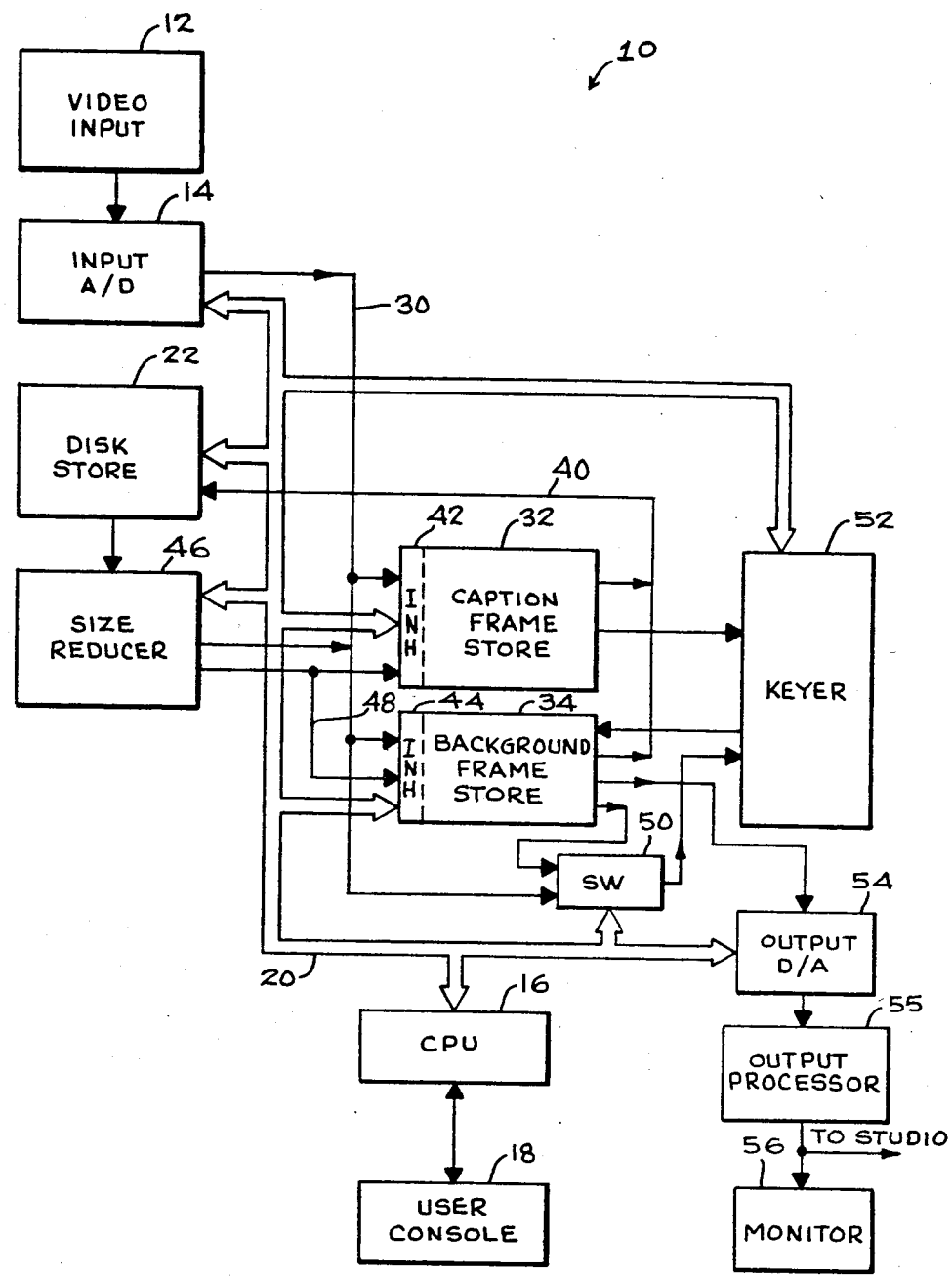
FIG_1

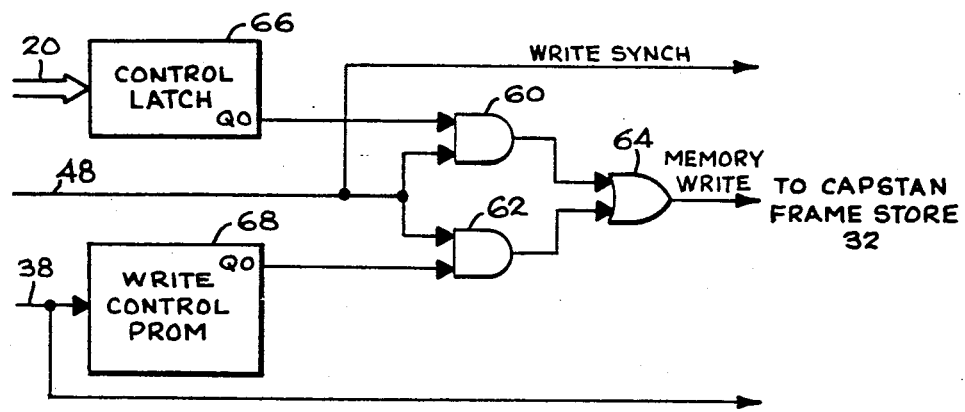
FIG_2
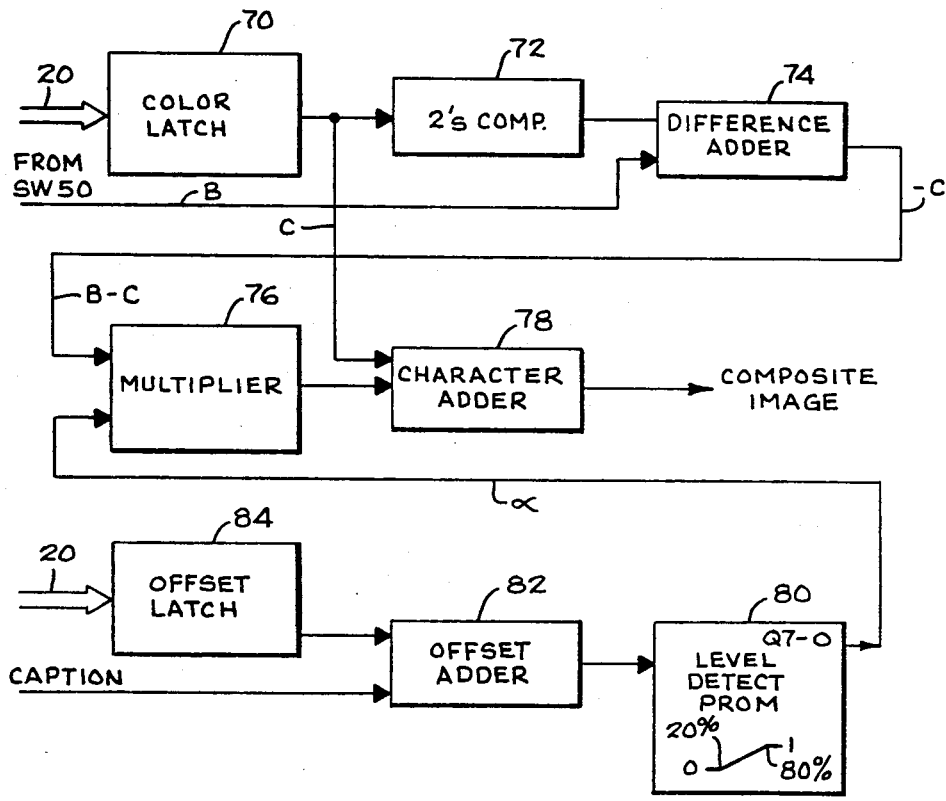
FIG_3

FONT RECALL SYSTEM AND METHOD OF OPERATION

FIELD OF INVENTION

This invention relates to a font recall system for use in generating a video image and more particularly to such a system which stores a character font in a high resolution digitized video form for selective insertion in a background video image.

DISCUSSION OF THE PRIOR ART

Conventional digital electronic still store systems store one or more video frames, i.e., two interlaced television fields of video information of data on a low cost storage medium for later output as a video image. Typically, a stored frame of data is communicated through a selective image size reducer to a frame store. The image is repeatedly read from the frame store to produce a continuous television video signal.

Oftentimes a television studio wishes to insert a written caption in the video signal to provide a written message to a television audience. Many different systems have been developed to accomplish this, but each suffers from one or more unsatisfactory aspects such as cost, inconvenience or reduced picture quality. Systems have been developed using digital character generators, but in even the best of these systems the bandwidth is sufficiently narrow that jagged edge aliasing cannot be avoided.

U.S. Pat. No. 4,360,831, "Multiple Image Digital Processing System", to Kellar discloses a multiple image processing system which mixes two or more images to form a single image. However, the system is not used to generate high quality alias-free character captions.

U.S. Pat. No. 3,532,806, "Arrangement for Combining Subtitle Information and Video Signals at the Television Transmitter", to Wicklund operates to automatically position a solid color background and border about subtitle character information being displayed to enable the character data to be more easily distinguished from the background image. The subtitle characters are generated by a source which is not described and mixed with a video image signal which has previously had a background band formed thereon at the location at which the text characters are to appear.

U.S. Pat. No. 3,465,097, "Subtitling System for Television Programs", to Brabon et al discloses a system in which the text is placed upon a paper strip and then mechanically moved past a text viewing video camera. The output of the text viewing camera is mixed with a background video image to produce the final television video signal.

SUMMARY OF THE INVENTION

A high dynamic resolution font recall system in accordance with the invention stores a font of characters with each character being stored as a character frame of video data of selected horizontal and vertical size in digital sample data form. The characters are selectively changed in size and assembled in a frame store to produce a desired caption, which may be inserted in a background video image.

The video display system includes a data store that stores a plurality of characters, each as a separate character frame of video data in eight bit high dynamic resolution digital sampled data form, an image size reducer coupled to receive character defining data from the data store and, in response thereto, output display character defining data defining characters of a selected size, a caption frame store coupled to receive the output display character defining data and store the received data at address locations therein selected so that characters defined by the received data are displayed at selected locations within a video image frame to form a caption, a video data source providing data defining a background video image, and a keyer coupled to receive the background video image defining data and the display character defining data and output in response thereto the background video image with the caption inserted therein.

In mixing the caption image with the background image, the keyer operates to insert in the background image a selected color at locations indicated by the shape of the captioned image with a dynamic intensity proportional to the dynamic intensity of characters within the captioned image. The dynamic blending of character edges into the surrounding image is thus preserved to eliminate undesirable jagged edge aliasing. As characters are assembled in the caption frame store, the writing of background data surrounding a received character is selectively inhibited to enable a received character to be positioned arbitrarily close to a previously stored character without the background of the received character overwriting any previously stored character.

BRIEF DESCRIPTION OF THE DRAWINGS

A better understanding of the invention may be had from a consideration of the following detailed description taken in conjunction with the accompanying drawings in which:

FIG. 1 is a block diagram representation of a video display system in accordance with the invention;

FIG. 2 is a block diagram and schematic representation of an inhibit circuit used in the display system shown in FIG. 1; and FIG. 3 is a block diagram and schematic representation of a keyer used in the video display system shown in FIG. 1.

DETAILED DESCRIPTION

Referring now to FIG. 1, a font recall system 10 for inserting characters comprising a desired caption in a background video image receives raster scan video data through a video input 12, which may be a TV camera, an electronic still store system, a source of TV programming or some other source of image defining video signals, and typically includes video signal processing circuitry that prepares the signal for conversion to digital form.

In the preferred embodiment of the font recall system 10, the video signal is processed in component form. A method and apparatus for producing the component information which may be employed is more fully disclosed in "Apparatus And Method For Chroma Separation", Ser. No. 482,118, filed Apr. 4, 1983, by Beaulier, which is incorporated by reference herein. Therefore, the video input 12 will include appropriate video signal decoding means to process video data received from sources that provide the data in an encoded form.

An input analog-to-digital (A-D) converter 14 receives the component video signal from the video input 12 and converts each pixel of the video signal to the digital sampled data form. In the preferred embodiment, each pixel of video data is represented by one eight bit data byte corresponding to the luminance and every other pixel also has two eight bit data bytes defining respectively R-Y chrominance and B-Y chrominance components. The chrominance data has half the spatial resolution of the luminance data in the horizontal dimension so that data is produced in a repetitive 4 byte luminance/chrominance component sequence of L1, CR1, CB1, L2-L3, CR3, CB3, L4 and so forth. The single byte representation afford a high dynamic resolution of 256 distinguishable states for each color component. For adequate dynamic resolution, each video component at a sample data point is preferably defined by at least 6 binary bits providing 64 distinguishable intensities.

A central processing unit (CPU) 16 is connected to respond to user commands entered through a user console 18. CPU 16 is coupled by a system bus 20 to control the font recall system 10. In the case of A-D converter 14, system bus 20 conveys mode control information, output control commands and returns status and diagnostic information to the CPU 16.

A disk store 22, such as a model DM980 disk drive marketed by Ampex Corporation, is coupled for communication of control, data and status information with CPU 16, and is employed as an image storage device. The DM980 disk drive is a disk storage device commonly used in general purpose computer system, and, employed as a disk store 22, provides relatively low cost storage for a plurality of frames of video images stored in high dynamic resolution digital sampled data form, such as the form in which video data is output by input A-D 14.

Among the frames of video data stored by disk store 22 are character frames defining a font of alphanumeric characters, with each character being defined as a separate character frame of video data of selected horizontal and vertical size, usually, less than a full horizontal and vertical frame size, defining the character as an image. In the preferred embodiment, the characters are stored on a size scale resulting in a size of 100 pixels horizontally by 100 lines vertically for the largest characters in the font. Each character is a monochrome image, stored as a black character centered at a precisely determined location within its character frame and appearing against a white background. The characters are stored with a full eight bits of dynamic luminance resolution at each pixel. The character definition data is effectively low pass filtered in the video input circuitry 12 so that at the character boundaries there is a gradual transition or blending from black to white, which eliminates jagged edge aliasing when the character is subsequently retrieved from disk store 22 and displayed. Since the character font is stored as a monochrome image, disk storage space can be conserved by storing only luminance data.

The frames of character defining data can be generated by CPU 16 and stored in disk store 22 under program control. Alternatively, the data can be generated by simply pointing a video camera connected as video input 12 at a camera card containing the character defined as black on a white background. The lighting and video gain is adjusted to produce a black level less that 20% of the full dynamic luminance range (binary 50) and a white level greater than 80% of the full dynamic luminance range (binary 205). The adjustment is made by the operator by observing the display of the waveform monitor while the video camera is providing the video signal representation of the character from the card and adjusting the gain of the video input (or the camera) until the proper levels are obtained.

If the font of characters is generated through the video input 12, data defining a character frame is communicated through input A-D 14 and then over a video data input bus 30 to a caption frame store 32, which may be substantially the same as a background frame store 34. From the caption frame store 32, the character defining data is communicated over a video data output bus 40 for receipt and storage by the disk store 22 at a storage location, which is identified by an appropriate address stored in the CPU memory for later retrieval under control of CPU 16 in response to requests entered by the operator through the user console 18.

The frame stores 32, 34 each provide storage of about 750 lines of video data (525 being actually used in the NTSC format). The frame stores 32, 34 are connected for communication of control and status data over system bus 20. The CPU 16 may thus be operated through the user console 18 to control the frame stores 32, 34 by enabling or disabling selected input or output ports, controlling frame pixel sizes and controlling the locations at which video data is written into or read from the frame stores 32, 34. Each frame store 32, 34 also includes write inhibit circuits 42, 44 which may be selectively engaged or disengaged under control of the data communicated by the CPU over the system bus when caption is to be generated in response to operator initiated commands input at the user console 18.

The write inhibit circuits 42, 44 are identical and are described in greater detail below with reference to FIG. 2. The write inhibit circuit 42 associated with the caption frame store 32 is operative while video data defining multiple characters comprising a desired caption are being assembled and stored in caption frame store 32. Before the first character is stored, caption frame store 32 is first cleared to a selected white background level. Then, as frames of character definition data are received by caption frame store 32, writing into the frame store 32 is inhibited on a pixel by pixel basis unless a received pixel is a black character pixel. If a pixel has a dynamic value less than the 80% white background value (binary 205), it is deemed to be a character pixel and not a white background pixel. In this way, the white background surrounding a given character in an image frame cannot overwrite a previously stored adjacent character. This enables an assembled caption to have the characters thereof assembled arbitrarily close without the white border of one character interfering with an adjacent character. At the same time, the pre-clearing of the caption frame store 32 results in a uniform white background above the 80% intensity level throughout the caption image. The write inhibit circuit 44 of background is not needed for the operation of the font recall system 10 but is provided so that the printed circuit boards may be similar for manufacture.

Selected frames of video data are communicated from disk store 22 to an image size reducer 46, which selectively retains or reduces the size of an image defined by the video data under control of information received from CPU 16. An image size reducer suited for use in the font recall system 10 of the present invention is more fully described in "System and Method for Transforming and Filtering a Video Image, Ser. No. 483,424, filed Apr. 8, 1983, by Beaulier and March, and incorporated by reference herein. Frames of caption characters are output by size reducer 46 onto the input data bus 30 along with a synchronizing output data clock signal on a conductor 48 for communication to the frame stores 32, 34.

A video switch 50 receives video data from video input bus 30 and video data from an output port of background frame store 34 and operates under control of information received over system bus 20 from CPU 16 to pass one of the two received streams of video data to a keyer 52. The source of video data coupled to the keyer 52 is determined by operator initiated commands provided to the CPU 16 via the user console 18.

Keyer 52 is described in greater detail below with reference to FIG. 3, but generally operates to receive from switch 50 video data defining a background image and simulantaneously receive from caption frame store 32 video data defining a selected caption. Keyer 52 mixes the background and caption images to generate video data defining a composite image frame which is communicated to background frame store 34 for stage thereby. Keyer 52 operates under control of information received over system bus 20 from CPU 16 in response to commands initiated by the operator at the user console 18, which information includes data defining the color of textual caption data inserted in the background video image.

The composite image data is output at a frame rate of, for example, 30 Hz for an NTSC television signal by background frame store 34 to an output digital-to-analog (D-A) converter 54 upon command by the operator entered through the user console. The interval over which the captioned image is output is also determined by the operator through the operation of the user console 18. Output D-A 54 operates under control of data received over system bus 20 from CPU 16 to convert the received digital data to analog form. The analog data is further processed by a conventional video signal output processor 55 to form a television signal in a standard television format. The analog television signal is then communicated to a monitor 56 for viewing by a system operator and also to studio broadcast and storage equipment, which is not shown.

In a first mode, the system 10 operates to store a single still frame image in background frame store 34, to use keyer 52 to mix the image with a caption stored by caption frame store 32, and then to return the single still frame composite mixed image to background frame store 34. The stored image is then ready to be repeatedly read from frame store 34 at the 30 Hz frame rate to generate a continuous stream of video data for outputting through output D-A 54.

Alternatively in a second mode, switch 50 is set to couple a continuous stream of moving image video data from video input 12 to keyer 52. Keyer 52 operates on a continuous frame by frame basis to mix textual caption data from caption frame store 32 with each new frame of background data. The mixed data is written into background frame store 34 on a repetitive frame after frame basis with the video data for each new frame being read out to output D-A 54 before it is overwritten by new video data defining the next frame of data.

The caption data to be keyed into the background video image data may be at improper video data levels. An offset latch 84 (FIG. 3) is provided to restore the caption data to the proper video data level. More specifically, the offset latch receives from CPU 16 over system bus 20 and stores an offset value (set by the operator through operation of the user console 18), which is added to the incoming caption input data values by offset adder 82 before presentation to the address input of level detect PROM 80. In the preferred embodiment, the caption data is adjusted so that the pure background will have a magnitude greater than 80% (binary 205) and so that the pure black character data will have a value less than 20% (binary 55).

It should be appreciated that the circuits of keyer 52 have been presented in a somewhat simplified form in FIG. 3 inasmuch as the full dynamic resolution color video data contains three color components as described above. Each of the three color components must be processed as described in conjunction with FIG. 3. For example, luminance data can be processed in one data path while half spatial resolution R-Y and B-Y chrominance data can be processed on an alternate time division multiplexed basis in a parallel path. If the caption image video data includes color components, only the luminance component thereof is responded to by keyer 52.

Referring now to FIG. 2, the inhibit circuit 34 includes a pair of AND gates 60, 62 having their outputs connected to an OR gate 64. The output of OR gate 64 generates signal memory write, MW, which commands a write access to caption frame store 32 when true. The output data clock signal on conductor 48 is selectively generated through logic gates 60, 62, 64 to generate signal MW and is also communicated directly through inhibit circuit 34 as a write sync signal that controls the timing, addressing and synchronization functions of caption frame store 32 when writing caption data therein.

A control latch 66 receives from system bus 20 a control parameter which selectively engages or disengages inhibit circuit 30. The control parameter is indicative of the system mode of operation, which is determined by the operator through the operation of the user console 18. The bit QO of control latch 66 is set whenever the system is placed in an operating mode to output video image signals without captions. When the control latch 66 is set, all data received by frame store 32 from image size reducer 46 on input bus 30 is written into the frame store 32 data storage locations under control of signal MW. The bit QO is reset to 0 whenever the system is placed in a caption insert operating mode by the operator. When the latch 66 is thusly reset, AND gate 60 is disabled and the output data clock signal is passed through AND gate 62 to generate signal MW when the QO output of a write control PROM 68 is set true by a command received over line 38 from the CPU 16.

The bytes of input caption data output by the image size reducer 46 over data input bus 30 are communicated as an address input to the write control PROM 68 for caption frame store 32. Write control PROM 68 is loaded to generate a logic 0 output at QO if the caption data value (or address input) for a pixel is greater than 80% of maximum (binary 205). Thus, if high intensity or white background data is received, the generation of signal MW is inhibited and the caption data cannot be written into the caption frame store 32 so long as the inhibit circuit 42 is engaged by the storage of a 0 in control latch 66. If a darker (character) data value less than or equal to 80% of the maximum dynamic range (binary 205) is received over line 30 at the address input of write control PROM 68 for a pixel, a logic 1 is output at the QO output thereof to enable AND gate 62 and permit the generation of signal MW. The actual character data as opposed to the background data may thus be written into caption frame store 32.

Keyer 52 is illustrated in greater detail in FIG. 3 and implements the image mixing function, $$Y = \alpha B + (1-\alpha)C \tag{1}$$

where Y is the composite output video data, B is background image defining data, and C is a set of stored data defining the share and color (but not the shape) of the caption image. $\alpha$ is a proportional control parameter. If $\alpha$ is 1, a background image is output, if $\alpha$ is 0, the caption image is output, and in between the two images are mixed in proportion to the magnitude of 60.$\alpha$ is derived from the caption frame store 32 data and operates to control the character shapes (as opposed to color) of the caption within the composite array.

Because multipliers are relatively expensive, equation (1) is implemented with only one multiplier in accordance with the following equation, $$Y = \alpha(B-C) + C \tag{2}$$

A color latch 70 receives from CPU 16 over system bus 20 and stores data "C" defining the color of desired textual material to be mixed with a background image, which is operator selectable through the user console 18. A 2's complement circuit 72 negates the color data for presentation to a difference adder 74, which also receives the background image data "B" from switch 50 and outputs the difference, B-C, to one input of a multiplier 76. Multiplier 76 multiplies this difference by the parameter $\alpha$ and outputs the product to a character adder 78, which adds back in the color data C as required by equation (2) to generate the composite image data.

The proportioning parameter $\alpha$ is generated by a level detect PROM 80 in response to the caption defining video data. PROM 80 receives offset adjusted caption video data for each pixel of the caption data from an offset adder 82 and responds to the digital value of the pixel to set the parameter, $\alpha$. The caption video data serves as an address for the PROM 80, and for address inputs below 20% (binary 55), PROM 80 outputs a value of 0. For address inputs greater than 80% (binary 205), PROM 80 outputs a value of 1 (binary 255). In between, the PROM 80 output is proportional to its input in accordance with the following function, $$\alpha = (\text{Adj. Caption-55})(150) \tag{3}$$

In summary, it will be seen that the keyer 52 receives the background image data and a caption image color value and mixes the two in inverse proportion to the black character-white background defining caption video data. The system 10 thus provides a highly convenient and economical system for automatically assembling a caption of any desired size and length under operator control via the user console 18 and mixing the caption with a selected background image. The user of high bandwidth video characters stored in digital sampled data pixel form produces a high quality caption of any selected color and shade, with jagged edge aliasing at character borders suppressed by filtering.

While there is shown and described herein a preferred embodiment of a video display system for captioning television video data in accordance with the present invention for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the present invention.

I claim:

1. A font recall system comprising:
   an image store storing a plurality of alpha-numeric characters, each of said characters being stored as a frame of video data defined by a raster of lines, said frame of video data being of selected horizontal and vertical size in high dynamic resolution digital sampled data form;
   a size reducer coupled to receive character defining data from the image store and in response thereto output display character defining data defining characters of a selected size;
   a caption frame store coupled to receive the output display character defining data and store the received data at address locations defining selected locations within a video image to form a caption of characters defined by the received data;
   a video data source providing data defining a background video image; and
   a keyer coupled to receive the background video image defining data and the display character defining data from the caption frame store and output in response thereto captioned image data defining the background video image with the caption superimposed thereon.

2. The font recall system according to claim 1 above, wherein the caption frame store includes a write inhibit circuit coupled to detect the receipt of noncharacter data and inhibit the writing of noncharacter data into the caption frame store.

3. The font recall system according to claim 2 above, wherein character data has a value less than or equal to a given magnitude and write inhibit circuit is operative to inhibit the writing of data having a value greater than the given magnitude.

4. The font recall system according to claim 3 above, wherein the given magnitude is 80% of the maximum possible magnitude.

5. The font recall system according to claim 1 above, wherein the keyer is operative to additionally receive and store data defining a selected display character color and generate the captioned image data by mixing the background video image defining data and the display character color defining data in proportion to a function of a proportioning parameter and a function of one minus the proportioning parameter, respectively, where the proportioning parameter is a value derived from the display character defining data.

6. The font recall system according to claim 5 above, wherein for values of the display character defining data less than 20% of its maximum possible value, the proportioning parameter is equal to zero, for values of the display character defining data greater than 80% of its maximum possible value, the proportioning parameter is equal to one, and for values of the display character defining data between 20% and 80% of its maximum possible value, the proportioning parameter increases linearly from zero to one in proportion to the value of the display character defining data less the value of the character defining data at the 20% point.

7. The font recall system according to claim 1 above, wherein the plurality of characters stored by the image store are each stored as a subframe of video data having a size less than a standard frame of television data.

8. The font recall system according to claim 1 above, wherein the plurality of characters stored by the image store are each stored as a subframe of video data having a size of 100 pixels wide by 100 lines high.

9. The font recall system according to claim 1 above, wherein the high dynamic resolution digital sampled data form comprises at least six bits of dynamic luminance resolution for each sample data point of a restored character.

10. The font recall system according to claim 1 above, wherein the high dynamic resolution digital sampled data form comprises at least eight bits of dynamic luminance resolution for each sample data point of restored character.

11. The font recall system according to claim 1 above, wherein each character stored by the image store is stored with a video data frequency less than half a sample data frequency.

12. The font recall system according to claim 1 above, wherein video data defining each character stored by the image store is low pass filtered prior to storage.

13. The font recall system according to claim 1 above, further comprising a central processing unit and a user console coupled to communicate user commands to the central processing unit, the central processing unit being coupled by a communication means to control font recall system devices to produce captioned images as commanded by a user through the user console.

14. The font recall system according to claim 13 above, further comprising a video monitor coupled to receive the captioned image data and display the background video image with the caption superimposed thereon defined by the captioned image data.

15. A high image quality font recall system comprising:
an image store for storing video data defining a font of high dynamic resolution low pass filtered characters, each character being defined within a 100 pixel by 100 subframe of video said data;
a size reducer coupled to receive from the image store said video data defining a selected character and convert said received video data to a character size less than or equal to the original character size;
a caption frame store coupled to receive from the size reducer said converted video data defining at least one character and to selectively store the converted data in caption frame store storage locations selected to produce a particular caption image;
a background frame store coupled to receive and store video data defining a video image frame;
a first switch coupled to receive and selectively output either video image defining said video image frame from the background frame store or video image defining video data from a video input;
a keyer coupled to receive and mix video data from the caption frame store defining said particular caption image and video image from the first switch defining a background image to produce video output data defining a high quality alias free captioned background image, the video output data being selectively coupled to either the background frame store for storage therein or to a second switch;
the second switch coupled to selectively receive and pass the video output data from either the keyer or the background frame store to produce a selected output video data;
an output digital-to-analog converter coupled to receive the selected output video data from the second switch and generate an analog television signal in response thereto;
a video monitor coupled to receive the analog television signal and generate a video image defined thereby;
a user console coupled to receive operator commands defining selected characters and sizes thereof and the positioning of characters to form a particular caption; and
a central processing unit coupled to said user console to control the image store, size reducer, caption frame store, background frame store, keyer and first and second switches to generate said selected output video data.

* * * * *

UNITED STATES PATENT AND TRADEMARK OFFICE
CERTIFICATE OF CORRECTION

PATENT NO. : 4,568,981
DATED : February 4, 1986
INVENTOR(S) : Daniel A. Beaulier It is certified that error appears in the above-identified patent and that said Letters Patent is hereby corrected as shown below:

Column 9, line 45, "video said" should read --said video--

Column 10, line 6, "said converted video" should read
                         --converted said video--.

Column 7, line 59, "user" should read --use--.

Signed and Sealed this

Twenty-fourth Day of June 1986

[SEAL]

Attest:

DONALD J. QUIGG

Attesting Officer     Commissioner of Patents and Trademarks